United States Patent [19]

Lacroix et al.

[11] Patent Number: 4,689,790
[45] Date of Patent: Aug. 25, 1987

[54] METHOD AND APPARATUS FOR REMOTE SIGNALLING ON A DIGITAL TRANSMISSION LINK

[75] Inventors: Jean-Claude Lacroix, Bruyeres le Chatel; Pierre Franco, Fresnes; Stéphane Le Gall, Sceaux; Gérard Bourret, La Ville Du Bois; Jacques Pochet, Le Plessis Pate, all of France

[73] Assignee: Compagnie Industrielle des Telecommunications Cit-Alcatel, Paris, France

[21] Appl. No.: 802,288

[22] Filed: Nov. 27, 1985

[30] Foreign Application Priority Data

Nov. 30, 1984 [FR] France ................................. 84 18320

[51] Int. Cl.$^4$ ............................ H04J 3/12; H04J 3/22
[52] U.S. Cl. .................................. 370/110.1; 370/84; 370/111
[58] Field of Search .................. 370/110.1, 85, 15, 99, 370/84, 111

[56] References Cited

U.S. PATENT DOCUMENTS

| 4,375,098 | 2/1983 | Gerke et al. | 370/111 |
| 4,394,759 | 7/1983 | Donne | 370/110.1 |
| 4,472,803 | 9/1984 | Iijima | 370/110.1 |
| 4,569,046 | 2/1986 | Hadziomerovic et al. | 370/85 |
| 4,581,746 | 4/1986 | Arnold | 370/111 |

Primary Examiner—Douglas W. Olms
Assistant Examiner—Curtis Kuntz
Attorney, Agent, or Firm—Sughrue, Mion, Zinn, Macpeak & Seas

[57] ABSTRACT

The method consists in momentarily replacing the data transmitted by a digital data link with a digital message comprising two non-consecutive sequences, with the first sequence being a prefix sequence and the other sequence being a suffix sequence. The period of time separating the prefix and suffix sequences is variable and encodes remote signalling data. FIG. 2 shows a message transmitter circuit fitted in digital link equipment for operation at a very high data rate, and provided with a circuit (6') for detecting and handing alarms and with a circuit (3) for recovering the bit rate from the digital stream. A pattern generator (10) serves to generate a 1000 pattern and its 0111 complement from the recovered check rate. An oscillator (20) has a period which defines the time interval separating the prefix sequence and the suffix sequence. This oscillator controls a sequencer (25) which in turn controls a prefix sequence building circuit (30) and a suffix sequence building circuit (40) both of which act via logic gates on a circuit for selecting pattern types and on switching means (19) for inserting the selected sequence into the digital stream instead data.

8 Claims, 6 Drawing Figures

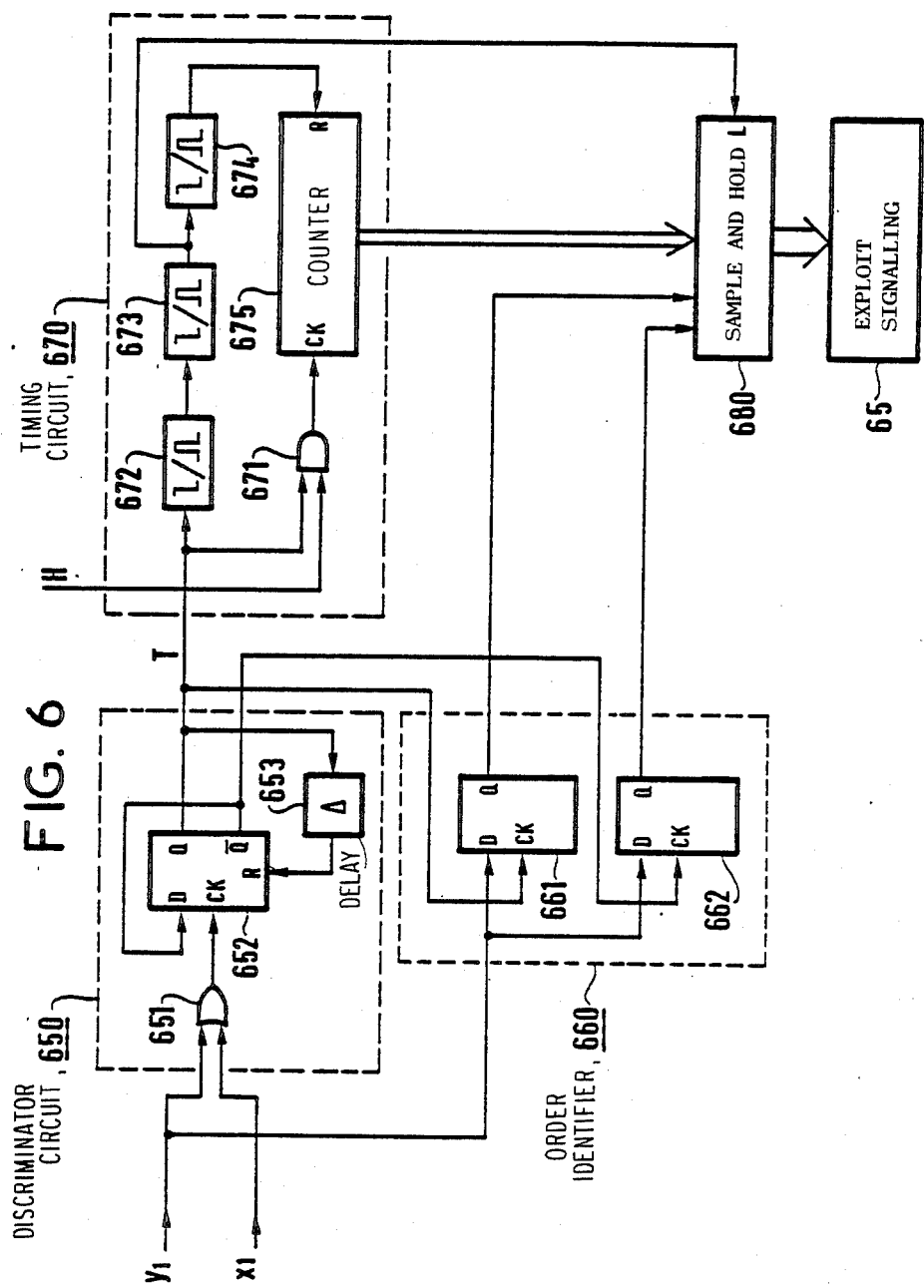

METHOD AND APPARATUS FOR REMOTE SIGNALLING ON A DIGITAL TRANSMISSION LINK

The present invention relates to remote surveillance of equipment distributed along a digital transmission link.

BACKGROUND OF THE INVENTION

In order to satisfy the reliability and operating lifetime requirements of very long distance transmission links, it has become necessary to provide optical fiber transmission systems with a degree of redundancy, in particular concerning the laser diodes which are fitted in the repeaters. This redundancy is obtained by initially equipping each repeater with several spare laser diodes which are subsequently brought into operation one by one by a switching circuit. Such a configuration requires means for remotely controlling the repeater switching circuits from the line's terminal equipment, together with remote signalling means from each repeater for informing the terminal equipment on the state of the laser diodes in service.

U.S. Pat. No. 4,281,416 describes an optical fiber digital link fitted with remote control enabling the laser diode in service in each repeater to be replaced by a spare laser diode, together with remote signalling specific to each repeater enabling an alarm to be transmitted when the bias current of the laser diode in service exceeds a threshold. The remote control signal is constituted by a digital message which is of the same nature as the digital signal transmitted over the link, and which is inserted into the transmitted traffic by the remote surveillance terminal. This digital message is repeated consecutively several times in order to avoid spurious operation, and it is constituted by a portion which identifies the repeater concerned, and a portion which identifies which laser diode is to be put into service in that repeater. The remote signalling signal is a pattern constituted by a pseudo-random binary string whose initial value identifies the source repeater.

This remote signalling has the drawback of requiring each repeater to include a source of pseudo-random strings capable of operating at the digital signal bit rate which, in an optical fiber digital transmission system, is an extremely high rate which must be provided using ECL technology, and which therefore consumes a great deal of energy. This constitutes a significant increase in the total energy consumed by the repeater, and above all it constitutes a considerable increase in the heat which the repeater must be capable of dissipating.

The above-described prior art system also suffers from the drawback of interrupting the link for a period of time which is long enough to cause synchronization to be lost in the digital data stream hierarchy, which means that such signalling can only be used for transmitting major alarms.

Preferred implementations of the present invention avoid these drawbacks and provide remote signalling by momentarily substituting a remote signalling message for the data normally conveyed by the link using a minimum of very high speed circuits for generating the messages and without disturbing the digital stream and its processing except during the time a message is actually being sent.

SUMMARY OF THE INVENTION

The present invention provides a method of remote signalling in which a message is substituted for data in a digital stream being conveyed by a transmission link, the method consisting in transmitting signalling by means of a digital message at the same bit rate as the digital stream, said digital message being built up from two non-consecutive sequences: a prefix sequence, and a suffix sequence; with the time interval occurring between said sequences being variable and encoding remote signalling data.

Apart from marking the beginning and the end of a time interval whose length conveys data, it is not essential for such sequences themselves to encode remote signalling data. As a result, their binary patterns may be chosen in such a manner as to satisfy as well as possible the constraints of avoiding accidental imitation of a message sequence by the digital data stream, and of facilitating sequence generation from the recovered bit rate signal since such a signal is always present in intermediate equipment on a digital transmission link.

The prefix and suffix sequences are advantageously constituted by respective periodic configurations of bits which are obtained by repeating a simple pattern built up by a minimum of very high speed circuits, using first sub-harmonics of the clock rate signal of the digital stream conveyed by the link.

In order to distinguish a remote signalling message in the midst of a digital stream, advantage may be taken of suitably selected sequence lengths and pattern definitions in order to obtain a sequence configuration which is illegal in the redundant code used in line transmission in order to monitor errors. For example, when a running digital sum code is being used, the prefix and/or suffix sequences can be arranged to cause the digital sum to overflow the limiting sum imposed by the line code used, whereas if an insertion bit line code is being used, a prefix or suffix sequence can be arranged to violate the rule used to define an insertion bit.

Each prefix or suffix sequence is itself subdivided into two portions, one of which is complemented, thereby providing a transition in the middle of a sequence which facilitates marking the beginning and ending instants of the time interval which encodes remote signalling data. This is to provide additional protection against the possibility of the conveyed digital stream imitating the beginning or the ending of a sequence. When such two-part prefix and suffix sequences are used, the order in which the two portions of each sequence are transmitted (i.e. complemented portion first or last) can be used in addition to the time interval between the prefix and suffix sequences for encoding additonal remote signalling data.

If a remote signalling message were to be inserted at a random moment into the digital stream, there would be a danger of losing the hierarchy synchronization of the stream. However, the danger of losing synchronization is avoided by ensuring that the sequences used to convey a remote signalling message are shorter than one sector of a frame at the highest level in the digital stream hierarchy, and by separating the sequences by a time interval which is considerably longer than one sector or time interval at the lowest hierarchy level.

The present invention also provides apparatus for performing the above method.

BRIEF DESCRIPTION OF THE DRAWINGS

An embodiment of the invention is described by way of example with reference to the accompanying drawings, in which:

FIG. 6 shows details of further parts of FIG. 4 and is a diagram of a circuit for discrimiating between prefix sequence transitions and suffix sequence transitions, a circuit for identifying the order of the complemented and non-complemented portions of a sequence, and a circuit for measuring the time interval between a prefix sequence followed by a suffix sequence.

MORE DETAILED DESCRIPTION

Figure 1:
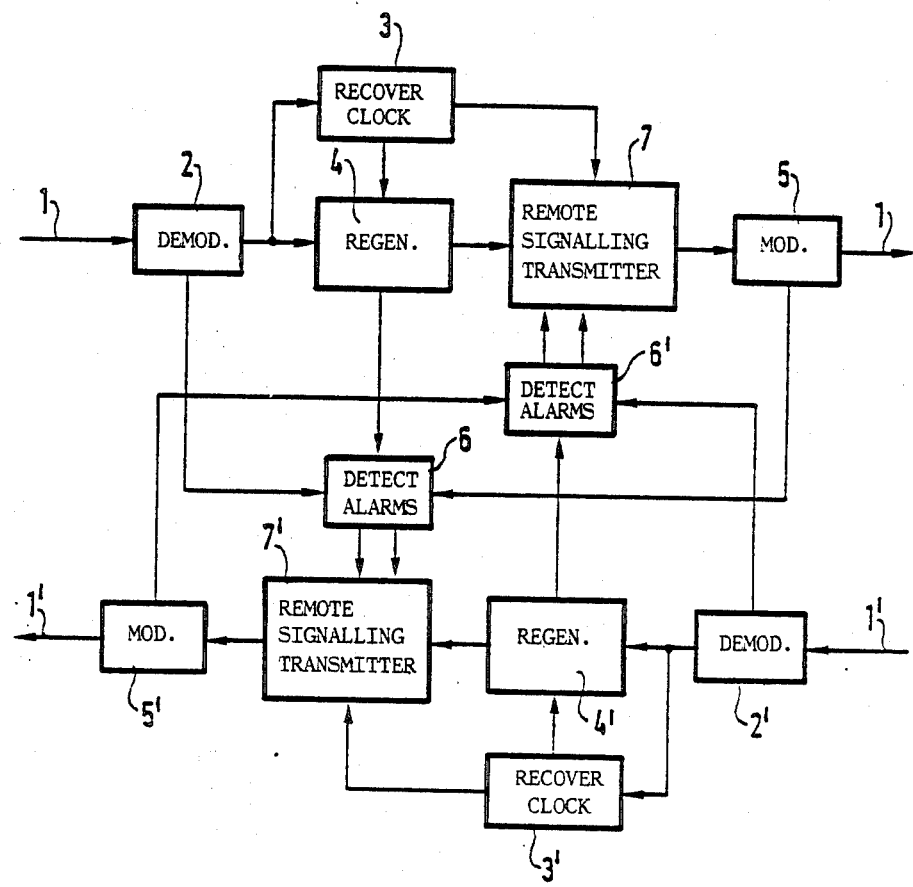
FIG. 1 is a block diagram showing how circuits for transmitting remote signalling messages are installed in a two-way repeater in an optical fiber digital transmission link.

The remote signalling system described below is applicable to a digital tranmission link operating at 295.6 Mbits/s over optical fibers and using a scrambled NRZ code with a type 24B1P parity bit. The digital transmission combines two 140 Mbits/s digital streams which are multiplexed into 4.736 $\mu$s frames each subdivided into seven sectors, and which are themselves built up by fourth order digital multiplexing using a hierarchy in accordance with the G700 series of CCITT recommendations. The remote signalling system is designed to serve not more than 200 equipments distributed along the link and to signal two types of anomaly per equipment along the link, and this information is signalled by means of messages, each of which comprises a prefix sequence and a suffix sequence which are separated by a time interval whose length is variable and thereby conveys remote signalling information.

Both the prefix and the suffix sequences comprise two consecutive portions which are complementary to each other, with a prefix sequence comprising a non-complemented portion P and complemented portion $\overline{P}$ and a suffix sequence comprising a non-complemented portion S and a complemented portion $\overline{S}$. The non-complemented portions (P or S) comprise 23 successive patterns of the type 1000, while the complemented portions ($\overline{P}$ or $\overline{S}$) comprise 23 successive patterns of the type 0111. Two different types of anomaly are encoded by the order in which the complemented and non-complemented portions S and $\overline{S}$ of a suffix sequence are transmitted. The identity of the equipment suffering the anomaly is encoded in two stages: firstly, the equipments are separated arbitrarily into two groups of not more than 100 equipments each, with the relevant group being encoded by the order in which the non-complemented and complemented (P and $\overline{P}$) portions of the prefix sequence are transmitted; and secondly the duration of the time interval between the prefix and suffix sequences specifies the relevant equipment within its group.

The variable time interval between the prefix and the suffix sequences in a remote signalling message may lie anywhere in the range 50 $\mu$s to 100 $\mu$s in steps of 0.5 $\mu$s, thereby enabling the identity of the equipment transmitting the remote signalling message to be encoded by selecting a particular time interval out of the 100 available time intervals, with different time intervals being allocated on a arbitrary basis to the equipments concerned.

A remote signalling message built up in this manner provides at least two parity violations in 24B1P code, thereby ensuring that it cannot be imitated by the data stream unless there is a transmission error, and also ensuring that the probability of imitation once over a period 25 years is much less than $1.10^{-4}$ for a digital stream suffering from an error rate of $1.10^{-2}$. The remote signalling messages disturb the clock rate of the digital stream very little since there is at least one transition in every group of four bits. Its disturbing effect on hierarchy synchronization in the digital stream is low and remains within tolerable limits since the prefix and suffix sequences have a length of 184 bits which corresponds to a duration of 622 ns at a transmission rate of 295.6 Mbits/s, and is therefore less than 677 ns duration of one frame sector in the highest level of the hierarchy in the digital stream, and also because the time interval between a prefix sequence and a suffix sequence is always at least 50 $\mu$s, which is considerably greater than 20 $\mu$s time interval or sector of a first order frame which includes justification.

FIG. 1 is a block diagram of a two-day repeater in a digital transmission link. Each path of the repeater is fitted with a circuit for transmitting remote signalling under the control of a circuit for detecting and handling alarms, which circuit monitors the other path through the repeater.

One of the paths regenerates optical signals conveyed by an optical fiber 1 in one direction and the other path regenerates optical signals conveyed by an optical fiber 1' in the other direction. In conventional manner, each path includes: an opto-electrical demodulator 2, 2' receiving the optical signal to be regenerated from the corresponding optical fiber 1, 1'; electronic pulse shaping circuits essentially constituted by a bit rate recovery circuit 3, 3' and a regenerator circuit 4, 4'; and an optical modulator 5, 5' which receives the regenerated signal and which re-inserts it into the optical fiber 1, 1'. Each path is additionally fitted with a circuit for detecting and handling alarms 6, 6' which monitors correct operation of the above-mentioned components, and which is capable of transmitting two types of alarm. Finally, each path is fitted with a remote signalling transmitter circuit 7, 7' which is inserted between the regenerator circuit 4, 4' and the optical modulator 5, 5', and which is controlled both by the bit-rate recovery circuit of the same path 3, 3' and by the circuit 6', 6 for detecting and handling alarms of the other path.

When an anomaly is detected on one of the paths, the circuit for detecting and handling alarms 6, 6' causes a remote signalling message to be transmitted over the other path towards the terminal which is situated upstream from the detected anomaly on the path suffering from said anomaly, thereby allowing said terminal to take appropriate action such as diverting traffic or remotely controlling a structural modification, e.g. changing over the laser diode in operation.

Figure 2:
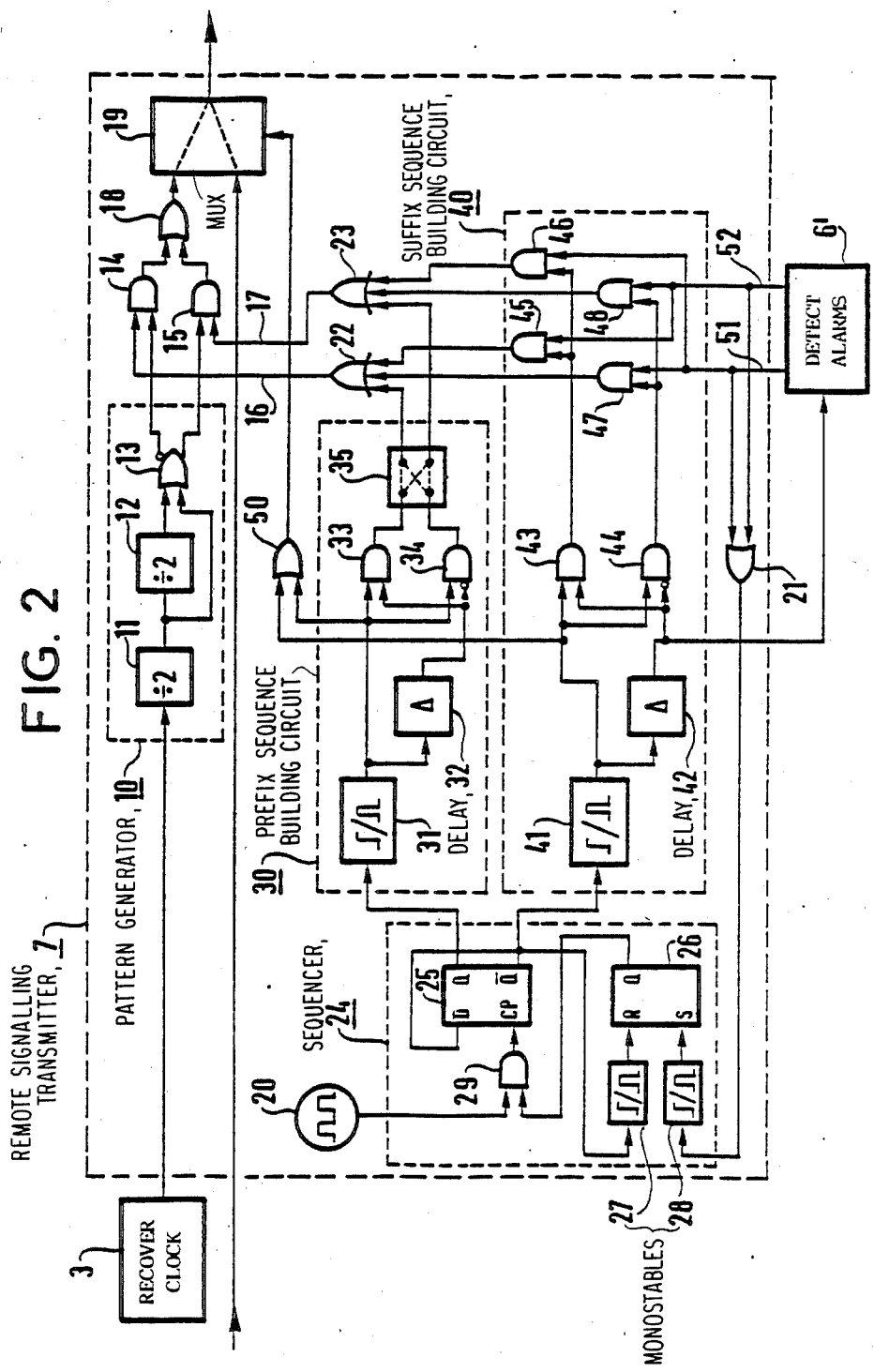
FIG. 2 is a diagram of a circuit for transmitting remote signalling messages in accordance with the invention.

FIG. 2 shows an embodiment of a remote signalling transmitter circuit. Specifically, it is a circuit diagram for the transmitter circuit 7 which comprises:

a pattern generator 10 for generating repetitive 1000 or 0111 binary patterns and constituted by two divide-by-two circuits 11 and 12 connected in series to the output from the bit rate recovery circuit 3, together with a logic OR gate 13 having two inputs and two outputs, one of which is an inverting output, with the inputs connected to respective outputs from the divide-by-two circuits 11 and 12, with the inverting output delivering a repetitive 1000 binary pattern and with the non-inverting output delivering the complementary binary pattern 0111;

a pattern type selector circuit constituted by means of two two-input logic AND gates 14, 15 with first inputs 16 and 17 to the gates 14 and 15 serving as select inputs and with the other inputs to said gates being connected to respective outputs from the pattern generator, the outputs from said AND gates being connected to two respective inputs of a logic OR gate 18;

a switching circuit constituted by a two-input multiplexer 19 having one input connected to the output from the logic OR gate 18 which constitutes the output from the pattern type selector circuit, and having its other input connected to receive the digital stream from the regenerator circuit (4, see FIG. 1), and having its output connected to the optical modulator (5, see FIG. 1);

an oscillator 20 generating a rectangular clock signal whose period defines the time interval separating the prefix and suffix sequences for remote signalling messages transmitted from equipment under consideration;

a sequencer 24 which is triggered by the circuit 6' for detecting and handling alarms via a logic OR gate 21 having inputs connected to respective outputs from the circuit 6', the sequencer being controlled by the oscillator 20 and serving to determine the initial instants at which the prefix and suffix sequences of a remote signalling message or sent;

a prefix sequence building circuit 30 which is triggered by the sequencer 24 and which acts on the select inputs 16 and 17 of the pattern type selection circuit via two three-input logic OR gates 22 and 23, and via a two-input logic OR gate 50 on the addressing control input to the multiplexer 19 which constitutes the switching circuit; and a suffix sequence building circuit 40 which is likewise triggered by the sequencer 24 and which acts, similarly to the prefix sequence building circut 30, on the select inputs 16 and 17 of the pattern type selection circuit via the three-input logic OR gates 22 and 23, and which acts via the two-input logic OR gate 50 on the addressing control input of the multiplexer 19 which constitutes the switching circuit.

The clock signal from the oscillator 20 which defines the time interval separating a prefix sequence from a suffix sequence in a remote signalling message from the equipment in question operates at a low frequency lying in the range 10 kHz to 20 kHz, and may be derived as a low-frequency beat between the signals of two oscillators operating at higher frequencies, which are easier to implement with a high degree of short term and long term stability.

When triggered by the circuit 6' for detecting and handling alarms, the sequencer 24 triggers the prefix sequence building circuit 30 on the first falling edge in the clock signal from the oscillator 20 which it receives thereafter, and then triggers the suffix sequence building circuit 40 on the following falling edge, at which point the sequencer is again disabled.

The sequencer 24 may be implemented, as shown, by means of a D type bistable 25 which is responsive to falling edges on its clock signal input and is connected as divide-by-two circuit, an RS type bistable 26 having its R and S inputs connected to receive output pulses respectively from monostables 27 and 28, both of which are responsive to rising edges on their respective trigger inputs. The R input monostable 27 is triggered by the complemented Q output from the D type bistable 25, and the S input monostable 28 is triggered by a rising edge in the output from the logic OR gate 21 which is connected to the outputs from the circuit 6' for detecting and handling alarms. Finally, the sequencer 24 includes a two-input logic AND gate 29 having its output connected to the clock input of the D type bistable 25, having one of its inputs connected to the output from the oscillator 20, and having its other input connected to the Q output from the RS bistable 26.

When there is no alarm, the circuit 6' for detecting and handling alarms holds both of its outputs at logic level zero, which logic level is forwarded by the logic OR gate 21. The RS type bistable 26 thus does not receive pulses on its S input and so maintains its Q output at a logic level zero which it acquired when the equipment was turned on or subsequent to the last pulse applied to its R input after the inverting Q output from the D type bistable 25 went to logic level 1 at the beginning of the suffix sequence of the last transmitted remote signalling message.

The logic level zero output from the RS type bistable 26 is applied to one of the inputs of the logic AND gate 29 and thereby inhibits the application of clock pulses to the clock input of the D type bistable 25. The D type bistable 25 thus retains a logic level zero at its Q output either from the moment it was switched on, or else from the beginning of the suffix sequence of the last remote signalling message transmitted.

When an alarm appears, one of the outputs of the circuit 6' for detecting and handling alarm changes to logic level 1, thereby providing a positive transition which propagates through the logic OR gate 21 and which is transformed by the monostable 28 into a pulse for application to the S input of the RS bistable 26. This pulses causes the RS bistable 26 to change state and its Q output switches to logic level 1 and thus enables the logic AND gate 29 to pass clock pulses to the clock input of the D type bistable 25. The clock signal from the oscillator 20 is then applied to the clock input of the D type bistable 25. The first falling edge in the clock signal after the gate 29 has been enabled causes the D type bistable 25 to change state and thus causes its Q output to provide a positive transition which marks the beginning of a prefix sequence. The following rising edge has no effect. The second falling edge causes the D type bistable 25 to return to its initial condition and thus deliver a positive transition on its complemented Q output which marks the beginning of a suffix sequence. This positive going transition is converted into a pulse by the monostable 27 and thus resets the Q output of RS bistable 26 to logic level zero, thereby re-inhibiting the logic AND gate 29 and preventing further clock pulses from reaching the D type bistable 25 until another remote signalling message is sent.

The prefix sequence building circuit 30 may be constituted, as shown, by:

- a monostable 31 which is connected to the Q output from the D type bistable 25 of the sequencer 24 and which, after being triggered by a positive transition, delivers a positive pulse at its output having the duration of one sequence, i.e. 622 ns;
- a delay circuit 32 connected to the output from the monostable 31 and serving to delay its output pulse by a period of time equal to one-half of the duration of a sequence, i.e. 311 ns;
- two two-input logic AND gates 33 and 34, with the gate 33 having two non-inverting inputs which are respectively connected to the output from the monostable 31 and to the output from the delay circuit 32, and the other AND gate 34 having a non-inverting input connected to the output from the monostable 31 and an inverting input connected to the output from the delay circuit 32; and
- a strapping region 35 enabling the output from a selected one of the AND gates 33 and 34 to be connected to a control input of the three-input OR gate 22, and the output from the other AND gate 34 or 33 to be connected to a control input of the other three-input OR gate 23.

The monostable 31 defines the duration of a prefix sequence. Its output pulse is used two perform functions. One is to be applied to the control input of the multiplexer 19 via the two-input logic OR gate 50 in order to temporarily connect the output from the pattern type selector circuit to the input to the optical modulator (5, see FIG. 1) in the equipment, and the other is to be applied to one of the select inputs 16 or 17 via the logic AND gates 33 and 34, the strapping region 35, and one or other of the logic OR gates 22 and 23 in order to cause one type of pattern to appear at the output from the circuit for selecting pattern types.

The delay circuit 32 defines a transition which separates the two complemented portions P and P in a prefix sequence by switching a first portion of the output pulse from the monostable 31 via the logic AND gates 33 and 34 to one or other of the select inputs 16 and 17 of the pattern type selector circuit, and by switching a second portion of the same monostable output pulse to the other one of the select inputs 17 or 16.

The strapping region 35 enables the transmitter circuit 7 to be set up on manufacture so that a desired one of the complemented and non-complemented patterns of a prefix sequence is sent first with the other one being sent second.

The suffix sequence building circuit 40 is of similar structure to the prefix sequence building circuit 30. It comprises:

- a monostable 41 which is connected to the complemented Q output from the D type bistable 25 of the sequencer 24, and which, on receiving a positive transition, delivers a positive pulse having the duration of one sequence, i.e. 622 ns;
- a delay circuit 42 connected to the output from the monostable 41 and serving to delay its output pulse by a period of time equal to one-half of the duration of one sequence, i.e. 311 ns;
- two two-input logic AND gates 43 and 44, with the gate 43 having two non-inverting inputs respectively connected to the output from the monostable 41 and to the output from the delay circuit 42, and the other AND gate 44 having a non-inverting input connected to the output for the monostable 41 and an inverting input connected to the output from the delay circuit 42; and
- two pairs of two-input logic AND gates 45, 46, 47 and 48, with all of the inputs thereto being non-inverting, each of said AND gates having one input connected to the output from one or other of the AND gates 43 and 44 and having its other input connected to one or other of the outputs 51 and 52 from the circuit 6' for detecting and handling alarms, and each having its output connected to one of the inputs of the three-input OR gates 22 and 23 in an arrangement such that an alarm appearing on the output 51 activates the select inputs to the pattern type selection circuit in the order 17, 16, and an alarm appearing on the output 52 activates the pattern type select inputs in the order 16, 17.

The monostable 41 defines the duration of a suffix sequence. In a manner similar to the monostable 31, the output pulse from the monostable 41 is applied both to the control input of the multiplexer 19 via the logic OR gate 50 in order to connect the output from the pattern type selector circuit to the input of optical modulator (5, see FIG. 1) of the equipment, and also to one or other of the select inputs 16 and 17 in order to cause one or other of the pattern types to appear at the output from the pattern type selector circuit.

The delay circuit 42 defines the transition which separates the two complementary portions S and S of a suffix sequence and operates via the two of logic gates 43 and 44 similarly to the output from the delay circuit 31 operating on the two of logic gates 33 and 34, and serves to switch a first portion of the ouput pulse from the monostable 41 to one or other of the select inputs 16 and 17 of the pattern type selector circuit and to switch a second portion of the same pulse to the other select input 17 or 16.

The two pairs of logic gates 45, 46, 47 and 48 constitute a switching matrix for swapping over the connections of the outputs from the pair of logic AND gates 43 and 44 to the inputs of the logic OR gates 22 and 23, thereby selecting which one of the select inputs 16 and 17 receives the first portion of the pulse from the monostable 41 and consequently selecting the order in which the complemented and non-complemented portions S and S of a suffix sequence are sent as a function of which one of the outputs 51 and 52 from the circuit 6' for detecting and handling alarms is at logic level one.

The negative transition which appears at the output from the delay circuit 42 at the end of a suffix sequence, i.e. at the end of a remote signalling message, is used as an acknowledge signal and is applied to the circuit 6' for detecting and handling alarms in order to cause it to switch off its alarm indication.

Figure 3:
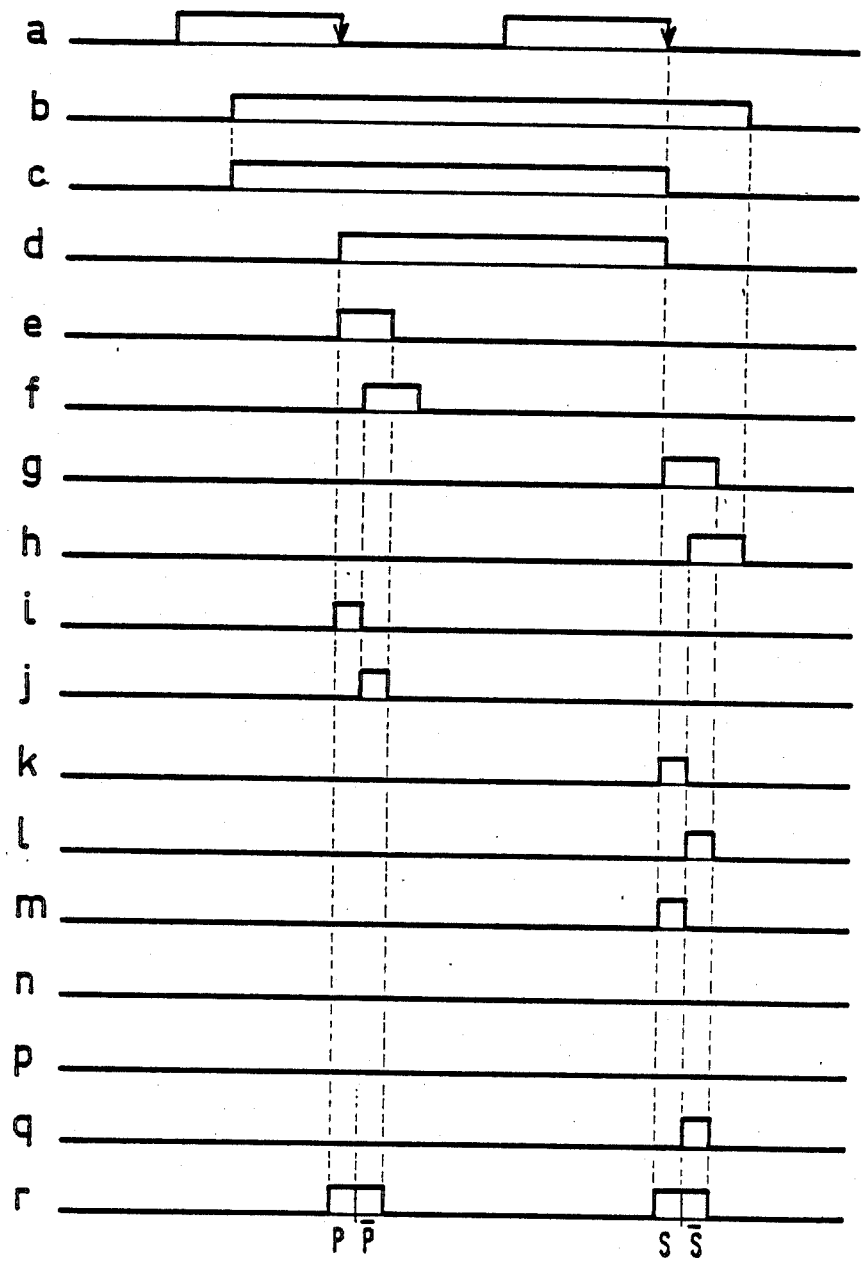
FIG. 3 is a waveform diagram for use in explaining the operation of the transmitter circuit shown in FIG. 2.

FIG. 3 is a waveform diagram showing the logical signals available at various portions of the transmitter circuit shown in FIG. 2. The waveforms are taken from the points indicated in the following table:

| Waveform letter: | where from: |
| --- | --- |
| a | clock signal output from the oscillator 20, |
| b | alarm output 51 from the circuit 6' |
| c | Q output from the sequencer RS type bistable 26 |
| d | Q output from the sequencer D type bistable 25 |
| e | output from the prefix building circuit monostable 31 |
| f | output from the prefix building circuit delay line 32 |

-continued

| Waveform letter: | where from: |
|---|---|
| g | output from the suffix building circuit monostable 41 |
| h | output from the suffix building circuit delay line 42 |
| i | output from the logic gate 34 |
| j | output from the logic gate 33 |
| k | output from the logic gate 44 |
| l | output from the logic gate 43 |
| m | output from the logic gate 48 |
| n | output from the logic gate 47 |
| p | output from the logic gate 46 |
| q | output from the logic gate 45 |
| r | resulting remote signalling message which would be obtained if the strapping region 35 has a crossed arrangement of straps. |

It may be observed that the beginnings and ends of the prefix and suffix sequences delivered at the output from the logic OR gate 18 in the pattern type selector circuit, and the transitions therein, are not synchronized on the transitions between bits of the digital stream, nor are they synchronized on transitions between patterns. This property greatly simplifies design of the transmitter circuit and is made possible by selecting a step of 0.5 $\mu$s for distinguishing the time intervals which separate the prefix and suffix sequences of any given remote signalling message, which step period is much greater than than the duration of a bit or even of a pattern. Naturally, a sampling bistable (not shown) is connected to the input of the switching circuit 19 and is controlled by the bit rate recovery circuit 3 to synchronize the signal at the output from the gate 18 with the bit rate of the digital stream.

Very few components of the remote signalling transmitter circuit need to be made from very high speed technology (i.e. ECL type) components which are compatible with a bit rate of 295.6 Mbits/s, but which consume large quantities of energy. The components which must be implemented in high speed ECL type technology are the divide-by-two circuits 11 and 12 which may be constituted by JK type bistables, together with the logic OR or NOR gates used for selecting one or other of the types of pattern. The remainder of the components in the transmitter circuit may be made of a slower, although still fast, technology such as I$^2$L or schottky type technology which are less energy-hungry than ECL type technology.

Figure 4:
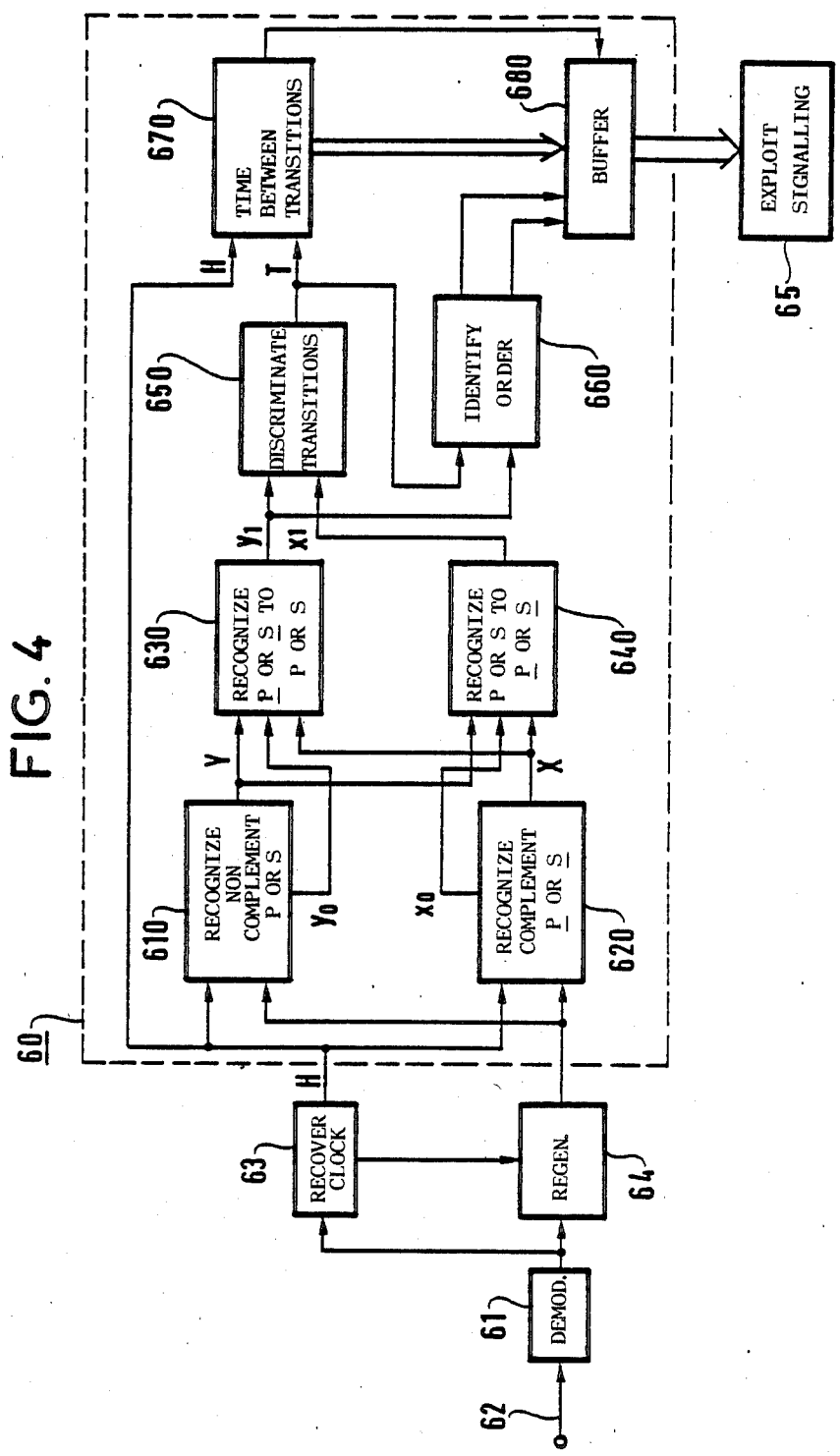
FIG. 4 is a block diagram of a circuit for receiving remote signalling messages as transmitted by the FIG. 2 circuit.

FIG. 4 is a block diagram of a circuit 60 for receiving the remote signalling, shown in its operating environment inserted in cable terminating equipment between a circuit 65 for exploiting signalling detected on an incoming fiber 62, and a receiver constituted by an optoelectronic demodulator 61 connected to the optical fiber 62 which conveys an incoming digital stream, and by electronic signal shaping circuits constituted mainly by a bit rate recovery circuit 63 and a regenerator circuit 64. These circuits are not described in greater detail since they do not constitute part of the present invention.

The remote signalling receiver circuit 60 comprises essentially:

a recognition circuit 610 for recognizing a non-complemented portion P or S of a prefix or a suffix sequence by means of a 1000 pattern detector and for generating a first output signal Y representative of a non-complemented portion P or S being recognized, and a second output signal $Y_0$ in response to each 1000 pattern;

a recognition circuit 620 for recognizing a complemented portion P or S of a prefix or a suffix sequence by means of a 0111 pattern detector and for generating a first output signal X representative of a complemented portion P or S being recognized, and a second output signal $x_0$ in response to each 0111 pattern;

a detector circuit 630 for detecting the existence of a transition in a prefix of a suffix sequence when the sequence is constituted by a complemented portion P or S followed by a non-complemented portion P or S, this circuit is connected downstream from the circuit 610 and 620 for recognizing the complemented and non-complemented portions and it generates a transition detection signal $y_1$;

a detector circuit 640 for detecting the existence of a transition in a prefix or a suffix sequence when the sequence is constituted by a non-complemented portion P or S followed by a complemented portion P or S, this circuit is connected downstream from the circuits 610 and 620 for recognizing the complemented and non-complemented portions and it generates a transition detection signal $x_1$;

a discriminator circuit 650 for discriminating between prefix sequences and suffix sequences, this circuit is connected to the outputs from the circuits 630 and 640 for detecting transitions and it generates a signal T in the form of a pulse which is delimited by said transitions;

an order identifier circuit 660 for identifying the complemented/non-complemented portion order of prefix and suffix sequences, this circuit is connected to the output from the transition detector 630 and to the output from the discriminator 650;

a timing circuit 670 for timing the duration of the pulse generated by the transition discriminator circuit 650; and a sampling memory 680 which receives the output signals from the order identifier circuit 660 and from the timing circuit 670, which information is written thereto after each pulse generated by the discriminator circuit 650.

The circuit for receiving remote signalling proceeds by stages in recognizing a remote signalling message. It begins by detecting the non-complemented portion P or S or the complemented portion P or S of a sequence in the transmitted digital stream independently of the prefix of suffix nature of said sequences, and this is performed by the recognition circuits 610 and 620. Once a non-complemented portion P or S or a complemented portion P or S has been detected, the receiver circuit looks for a transition between two portions of the same sequence by seeking the first pattern of the complementary portion and by confirming the existence of the complementary portion by means of the transition detector circuits 630 and 640, one of which is specific to detecting transitions from non-complemented portions to complemented portions and the other of which is specific to detecting transitions from complemented portions to non-complemented portions. The first detected transition is deemed to belong to a prefix sequence whose order (non-complemented portion first or second) is identified by the order identifier circuit 660 determining which one of the transition detection circuits 630 and 640 has operated. This transition serves to start the timing circuit 670. The second detected transition is deemed to belong to a suffix sequence whose order is likewise identified by the order identifier circuit 660 detecting which one of the transition detector circuits has operated. This stops the timing circuit 670 and causes the contents of a remote signalling message to be written to the sampling memory 680, i.e. it causes the following data to be written: the order of the prefix sequence (complemented portion first or second), indicative of one or other of the groups of 100 equipments to which the remote signalling message transmitter belongs; the duration of time interval between the prefix and suffix sequence transitions of the message, indicative of the number of the transmitter equipment within its own group; and the order of the suffix sequence, indicative of the type alarm.

Figure 5:
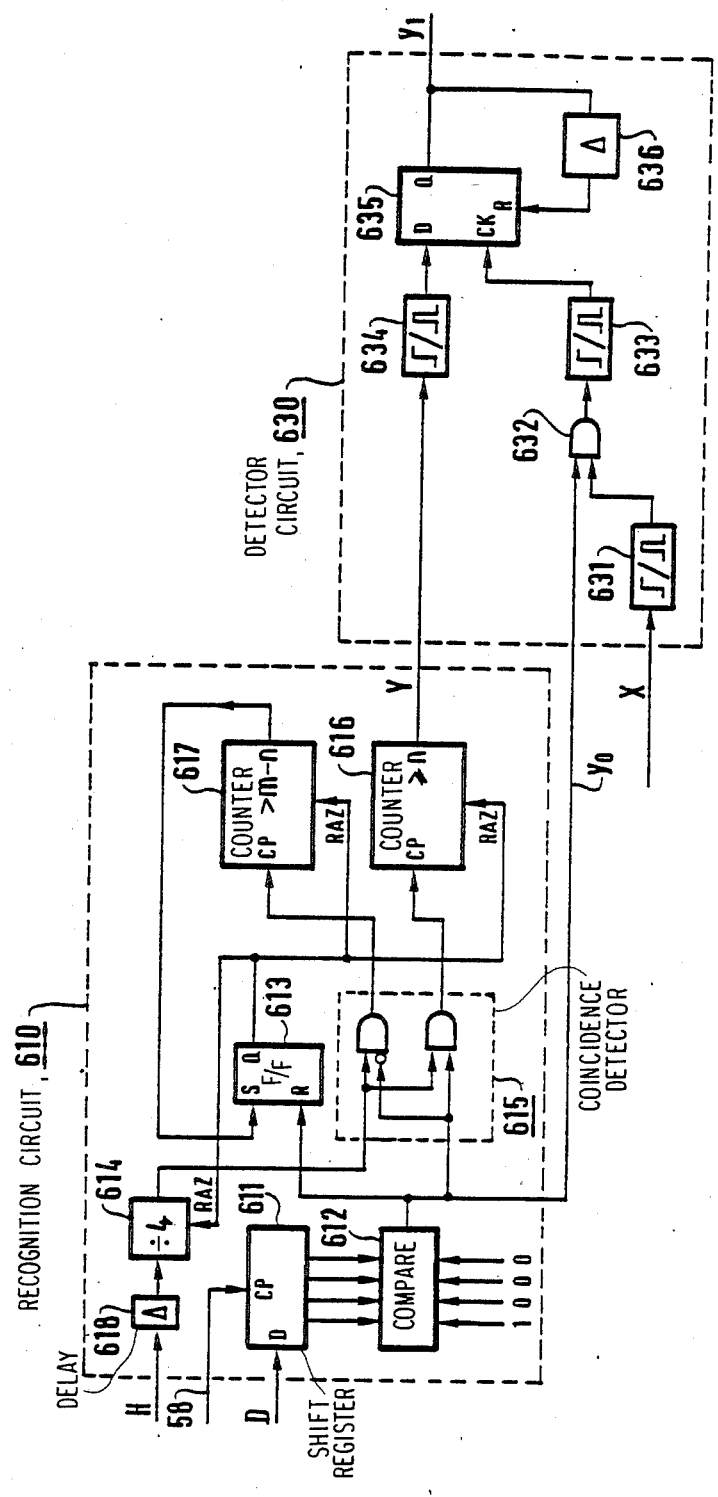
FIG. 5 shows details of parts of FIG. 4 and is a diagram of a circuit for recognizing the complemented and non-complemented portions of prefix or suffix sequences in a remote signalling message, and a circuit for detecting transitions therebetween.

FIG. 5 shows an embodiment of the recognizer circuit 610 for recognizing the non-complemented portion of a sequence, together with the detector circuit 630 for detecting the transitions in sequences which begin with a complemented portion.

A non-complemented portion of a prefix or suffix sequence is constituted, as mentioned above, by a string of 23 consecutive 1000 type binary patterns. In order to recognize this non-complemented portion, the circuit 610 adopts a pattern rate which coincides with the first detected 1000 pattern and it verifies that this pattern is indeed a part of a string of n 1000 patterns out of m successive patterns, i.e. out of a sucession of bits in the digital stream beginning with said pattern and having a length of not more than m patterns, where n is taken to be equal to 21 and m to be equal to 23, thereby allowing for one error in the patterns.

The recognizer circuit 610 for recognizing a non-complemented portion of a sequence comprises:

a four-stage shift register 611 having a serial input and parallel outputs, which receives the digital stream D on its "data" input after it has been shaped by the regenerator circuit 64, and which receives the bit rate signal H from the recovery circuit 63 on its clock input;

a comparator 612 for comparing two four-bit numbers, one of which is hardwired to logic levels 1000 and the other of which is connected to the parallel output from the shift register 611, and whose output delivers the signal $Y_0$ representative of a 1000 pattern being identified;

a trigger circuit constituted by an RS type bistable 63 having its R input connected to the output from the comparator 612;

a pattern rate generator constituted by a divide-by-four circuit or counter 614 which operates at the bit rate as supplied by the bit rate recovery circuit 63 and which delivers an asymmetrical signal having a logic level 1 during a state 1 and a logic level 0 during three other states, said signal having its positive going transitions synchronized, to within a small delay, on the instant at which the first pattern is detected by the comparator 612 since its reset to zero input is controlled by the Q output from the RS bistable 613 of the trigger circuit with a delay line 618 acting on the bit rate signal H as applied to the input of the divide-by-four circuit 614 in order to compensate for the propagation delays through the divide-by-four circuit 614 relative to the transitions in the bit rate signal from the recovery circuit 63 which causes changes to propagate therethrough;

a coincidence detector 615 which samples the output from the comparator 612 at the rate established by the pattern rate generator in order to apply count signals on two distinct outputs, one for counting occasions on which a non-complemented portion pattern is present and the other for counting occasions on which such a pattern is absent, said coincidence detector comprising a first logic AND gate having two non-inverting inputs whose output delivers the pattern presence count instructions in the form of positive transitions and whose inputs are connected respectively to the output from the comparator 612 and to the output from the divide-by-four circuit 614 of the pattern rate generator, and a second logic AND gate having two inputs, one of which is an inverting input and the other of which is not, the output from said AND gate delivering pattern absence count instructions in the form of positive transitions, the inverting input being connected to the output from the comparator 612, and the non-inverting input being connected to the output from the divide-by-four circuit 614 of the pattern rate generator;

an n counter 616 having a reset to zero input controlled by the Q output from the RS bistable 613 of the trigger circuit, a count input responsive to positive transitions connected to the output of the coincidence detector 615 which delivers pattern presence count instructions, and an overflow output which changes to logic level 1 when its count reaches or exceeds n, which output constitutes the Y output from the circuit 610 for recognizing non-complemented portions P and S; and an m-n counter 617 having a reset to zero input controlled by the Q output from the RS bistable 613 of the trigger circuit, a count input responsive to positive transitions connected to the output from the coincidence detector 615 which delivers pattern absence count instructions, and an overflow output which passes to logic level 1 whenever its count exceeds m-n, which output controls the S input to the RS bistable 613 of the trigger circuit.

So long as a 1000 pattern is absent from the successive bits of the digital stream for a period which exceeds m-n patterns, the trigger circuit constituted by the RS bistable 613 is in an off position since its Q output delivers a logic level 1 which holds the divide-by-four circuit 614 of the pattern rate generator to zero, and similarly holds in the zero state the n and m-n counters 616 and 617 for counting occasions on which the pattern is present or absent respectively.

Once a 1000 pattern appears in the digital stream delivered by the regenerator circuit 64, the comparator 612 detects it and responds by delivering a positive pulse which turns on the trigger circuit RS bistable 613 whose Q output changes to logic level zero, thereby releasing the n and m-n counters 616 and 617 and also releasing the divide-by-four circuit 614 of the pattern rate generator whose positive transitions are thereafter synchronized, with a small delay, on the instant at which the initial 1000 pattern was detected by the comparator 612. Said positive pulse is also applied to the coincidence detector 615 which uses it to generate a pattern presence count instruction for use by the n counter 616. At each subsequent positive transition in the output signal from the divide-by four circuit 614 of the pattern rate generator, the coincidence detector 615 takes account of the presence or absence of a new positive pulse at the output from the comparator 612 to generate an instruction for counting the presence or the absence of a pattern by the n counter 616 or by the m-n counter 617.

If the m-n counter 617 overflows, the number of recognized absences of the pattern exceeds m-n, and consequently a non-complemented portion of a sequence is not being received. This turns off the trigger circuit RS bistable 613 which in turn holds the divide-by-four circuit 614 of the pattern rate generator and the n and m-n counters 616 and 617 in their zero states.

If the n counter 616 overflows (which can only take place so long as the m-n counter 617 has not overflowed in the meanwhile), then a non-complemented portion of a sequence has been recognized and the overflow output constitutes the output signal Y from the circuit 610.

The recognition circuit 620 for recognizing a complemented portion P or S of a prefix or a suffix sequence may be of identical structure to the circuit 610 except insofar as the hardwired input to its comparator is connected to logic levels 0111 representative of a complemented portion.

The detector circuit 630 for detecting the transition in a sequence which begins with a complemented portion and which ends with a non-complemented portion comprises:

a first monostable circuit 631 which is triggered on a rising edge of the signal X indicating that the circuit 620 has recognized a complemented portion P or S of a prefix sequence or a suffix sequence, and which generates a positive pulse having a duration equal to 25 patterns, i.e. 100 bits or 338 ns at the bit rate 295.6 Mbits/s being used, and which lasts for the duration of a complemented or non-complemented portion of a sequence;

a two-input logic AND gate 632 having one input connected to the output from the first monostable circuit 631 and having its other input receiving the signal $Y_0$ from the circuit 610 for recognizing the non-complemented portion, which signal has positive pulses each time a 1000 pattern is recognized;

a second monostable circuit 633 which is triggered by a rising edge in the output signal from the logic AND gate 632 and which delivers at positive pulse for a period of time equal to 25 patterns or 100 bits or 338 ns at a bit rate of 295.6 Mbits/s;

a third monostable 634 which is triggered by a rising edge in the signal Y indicating that the circuit 610 has recognized a non-complemented portion P or S of a sequence, and which delivers a positive pulse having a duration of a few patterns, e.g. 50 ns; and a D type bistable 635 having its D input connected to receive the output signal from the third monostable 634, having its clock input which is responsive to falling edges connected to the output from the second monostable 633, and having a reset to zero input R connected to its own Q output via a delay circuit 636 which inserts a delay of 1 μs.

Each time a complemented portion P or S of a sequence is detected, the circuit 620 causes its X output to go to logic level 1, thereby triggering the first monostable 631 which opens the logic AND gate 632 for a certain period of time while waiting for the first 1000 pattern of a non-complemented portion P or S to be recognized as shown by a positive pulse in the $Y_0$ signal. The time window defined in this way for selecting the pulse in the signal $Y_0$ which corresponds to recognition of the first 1000 pattern of the second portion of a sequence which begins with a complemented portion must be of sufficient duration to take account of the worst case possibilities of data in the digital stream imitating a string of 0111 patterns ahead of a complemented portion P or S, which possibilities could lead to anticipation in the detection of said complemented portion and must be compensated for by having a window of sufficient width. A duration which is equal to or slightly greater than the duration of a complemented or non-complemented portion of a sequence is satisfactory.

If the complemented portion which causes the transition to logic level 1 in the signal X is the beginning of a sequence, it is followed by a non-complemented portion whose first 1000 pattern occurs shortly after the transition which is to be located. This first pattern is detected in the time window as determined by the first monostable 631 and causes a pulse to appear in the signal $Y_0$ which pulse passes through the logic AND gate 632 and triggers the second monostable 633.

The second monostable returns to its rest state after a period of time which is slightly greater than the maximum period necessary for the circuit 610 to recognize a non-complemented portion P or S of a sequence. In the present case, where one error in the pattern is admissible, this maximum duration is 24 patterns or 325 ns. At the instant at which the second monostable 633 returns to zero, the D type bistable 635 copies the logic level applied to its data input D. This input is at logic level 1 if the third monostable has been triggered by a non-complemented portion P or S being effectively recognized by the circuit 610, or at logic level zero when no complemented portion has been recognized by the circuit 610 and the 1000 pattern taken to be the beginning of a non-complemented portion turns out to have been an imitation due to the data in the digital stream.

Thus, the appearance of a logic level 1 at the Q output of the D type bistable 635 of the detection circuit 630 corresponds to the appearance of a transition in a prefix sequence of a suffix sequence of a remote signalling message, which sequence comprises a complemented portion P or S followed by a non-complemented portion P or S.

1 μs after any transition to logic level 1, the Q output of the D type bistable 635 is reset to zero by the delay circuit 636, thereby returning the detector circuit 630 to a condition in which it is again available for detecting a further transition.

The circuit 640 for detecting a transition in a prefix or suffix sequence which begins with a non-complemented portion P or S followed by complemented portion P or S has exactly the same structure as the above-described transition detector circuit 630.

FIG. 6 shows an embodiment of the discriminator circuit 650 for discriminating between the transitions of prefix and suffix sequences as connected downstream from the two detector circuits 630 and 640, together with a circuit 660 for identifying the order of the complemented and non-complemented portions of prefix and suffix sequences and the timing circuit 670.

The discriminator circuit 650 for discriminating between transitions in the prefix and suffix sequences comprises a two-input logic OR gate 651 whose inputs are connected to the outputs from the transition detector circuits 630 and 640, a D type bistable 652 connected as a divide-by-two circuit having its clock input connected to the output from the logic OR gate 651, and a 110 μs delay circuit 635 connecting the Q output of the D type bistable 652 to its reset to zero input.

The delay circuit 653 ensures that the Q output of the D type bistable 652 always returns to logic level zero after each occasion on which it goes to logic level 1. At rest, i.e. when there is no remote signalling message, the D type bistable 652 has its Q output at logic level zero. When the remote signalling message comprising a prefix sequence followed by a suffix sequence within the following 50 µs to 100 µs is being received, the Q output from the D type bistable 652 goes to logic level 1 when the transition is detected in the prefix sequence by one of the detector cicuits 630 and 640, and it returns to logic level zero between 50 µs and 100 µs later when the transition is detected in the suffix sequence. If a transition is not detected due to errors in transmission (and this may happen in the prefix sequence or in the suffix sequence) the Q output of the D type bistable 652 returns to logic level zero after 110 µs, by virtue of the delay circuits 653.

Thus, the square wave pulse T delivered at the Q output from the D type bistable 652 corresponds to the time interval between the transition of a prefix sequence and the transition of a suffix sequence (to within a possible error of two patterns) provided its duration lies in the range 50 µs to 100 µs, and it corresponds to an error if it lasts for 110 µs. The error of up to two patterns is due to the fact that the transition within a sequence is not synchronized with the patterns when the sequence is transmitted.

The circuit 660 for identifying the order of the complemented and non-complemented portions of prefix and suffix sequences comprises two D type bistables 661 and 662 both having their data inputs D connected to receive the signal $Y_1$ from the detector circuit 630 for detecting transitions which appear in sequences beginning by a complemented portion and ending by a non-complemented portion. One of the D type bistables 661 has its clock input CK responsive to rising edges connected to the Q output from the D type bistable 652 of the circuit 650 for discriminating between the transitions of prefix sequences and suffix sequences, and copies the state of is D input on each rising edge in the square wave pulse T, i.e. each time there is a transition in a prefix sequence. The other D type bistable 662 has a clock input which is responsive to rising edges connected to the complemented Q output from the D type bistable 652 of the circuit 650 for discriminating between transitions in prefix sequences and suffix sequences, and copies the state of its data input D on each falling edge of the square wave pulse T, i.e. of each transition in a suffix sequence. The D type bistable 661 records the order of the prefix sequence and the D type bistable 662 records the order of the suffix sequence. Both of them go to logic level 1 if the corresponding transition appears in a sequence comprising a complemented portion followed by a non-complemented portion, and to logic level zero in the opposite case.

The timing circuit 670 operates from the clock signal H supplied by the bit rate recovery circuit 63 and the square wave pulse T delivered by the circuit 650 for discriminating between transitions in prefix sequences and in suffix sequences. It comprises:

a two-input logic AND gate 671 receiving the logic signals H and T;

a first monostable circuit 672 which is triggered by falling edges, which receives the signal T, and which generates a positive pulse in response thereto for a period of 1 µs;

a second monostable circuit 673 which is triggered by falling edges, which is connected downstream from the first, and which generates positive pulses having a duration of 0.5 µs;

a third monostable circuit 674 which is triggered by falling edges, which is connected downstream from the second monostable, and which generates positive pulses having a duration of 0.5 µs; and a parallel output counter 675 having its count input connected to the output from the logic AND gate 671 and having its reset to zero input connected to the output from the third monostable circuit 674.

The counter 675 is provided with pre-divider circuit which reduces its count period to 0.5 µs. It counts the periods of the clock H which are applied to its count input during the square wave pulses T by means of the logic AND gate 671, and it is reset to zero by the chain of three monostables 672, 673 and 674, 1.5 µs after the end of each square wave pulse T.

The first monostable 672 delays reading of the counter 675 by 1 µs relative to the falling edge in the square wave pulse T. The second monostable 673 generates a 0.5 µs pulse for controlling writing to the sampling memory 680 which then receives the contents of the counter 675, the the contents of the two D type registers 661 and 662 in the circuit for identifying the order of the portions in prefix and suffix sequences.

The third monostable 674 generates a pulse for resetting the counter 675 to zero after the sampling memory has been written to.

There are several components in the receiver circuit which must operate at a very high data rate and which therefore require very high speed circuits which are energy hungry. However, this is not important since remote signalling is exploited on a digital link by a relatively small number of equipments, which are in general locally powered rather than being remote powered. The opposite is true of the remote signalling transmitter circuits which are numerous and are generally located in remotely powered equipment.

We claim:

1. A remote signalling method for a digital transmission link which carries digital data, said method comprising:

forming a remote signalling message of two non-consecutive sequences, the first sequence being a prefix sequence and the second sequence being a suffix sequence, said sequences being separated by a variable time interval whose length encodes remote signalling data, each of said prefix and suffix sequences being themselves subdivided into two portions each of which is obtained by repeating a binary pattern which is the complement of the binary pattern repeated in the other portion, with the transition between the two portions of a prefix sequence marking the beginning of said time interval encoding remote signalling data, and with the transition between the two portions of a suffix sequence marking the end of said time interval; and transmitting said remote signalling message at the same bit rate as the digital data stream conveyed by said link by momentarily substituting said remote signalling message for the data being carried by said link.

2. A method according to claim 1, wherein one of said binary patterns repeated in the portions of said prefix and suffix sequences is constituted by the four bits 1000 in succession.

3. A method according to claim 1, wherein the order in which said complementary patterns are transmitted within a sequence also encodes remote signalling data.

4. Apparatus for implementing a remote signalling method for a digital transmission link which carries digital data, said method comprising the steps of forming a remote signalling message of two non-consecutive sequences, the first sequence being a prefix sequence and the second sequence being a suffix sequence, said sequences being separated by a variable time interval whose length encodes remote signalling data, each of said prefix and suffix sequences being themselves subdivided into two portions each of which is obtained by repeating a binary pattern which is the complement of the binary pattern repeated in the other portion, with the transition between the two portions of a prefix sequence marking the beginning of said time interval encoding remote signalling data, and with the transition between the two portions of a suffix sequence marking the end of said time interval, and transmitting said remote signalling message at the same bit rate as the digital data stream conveyed by said link by momentarily substituting said remote signalling message for the data being carried by said link, said digital link including at least one equipment fitted with a circuit for detecting and handling alarms and with a circuit for recovering the bit rate of the digital data carried on said link, said apparatus comprising at least one remote signalling circuit for transmitting a remote signalling message and located in said equipment, said remote signalling circuit comprising:

a four-bit binary pattern generator comprising two divide-by-two circuits connected in series to the output from the bit rate rcovery circuit together with a two-input logic OR gate having its inputs connected to the outputs from respective ones of the divide-by-two circuits, said pattern generator having two outputs, one of which is a complemented output and the other of which is a non-complemented output;

a pattern type selector circuit comprising logic gates and serving to select one or other of the two outputs from said pattern generator;

a switching circuit for momentarily inserting the signal from said selector circuit into the digital data stream conveyed by the link in place of the data which would otherwise be conveyed by said link;

an oscillator whose period defines the time interval separating a prefix sequence from a suffix sequence in a remote signalling message as transmitted by the equipment under consideration;

a sequencer which is triggered by the circuit for detecting and handling alarms and which is controlled by said oscillator to determine the initial instants of the prefix and suffix sequences of a remote signalling message;

a prefix sequence building circuit which is triggered first by said sequencer and which acts via logic gates on select inputs to said pattern type selector circuit in order to build up a prefix sequence, and which also acts on a switching control input in order to insert the prefix sequence in the digital data stream instead of data; and a suffix sequence building circuit which is triggered second by said sequencer and which acts via logic gates on the select inputs to said pattern type selection circuit in order to build up a suffix sequence, and which also acts on the switching control input in order to insert the suffix sequence into the digital data stream instead of data.

5. Apparatus according to claim 4, wherein said prefix and suffix sequence building circuits each comprise:

a monostable defining the duration of a sequence and acting on the control input of said switching circuit;

a delay circuit connected to the output from said monostable and serving to split a sequence into two portions, one of which portions constitutes a complemented portion and the other a non-complemented portion; and a two-channel demultiplexer terminating on select inputs to the pattern type selector circuit, said demultiplexer being constituted by logic gates, being enabled by the monostable, and being addressed by the delay circuit.

6. Apparatus according to claim 5, wherein one of said sequence building circuits further includes a strapping region inserted between the outputs from said two demultiplexer paths and serving either to connect said paths straight through or else to interchange their corrections.

7. Apparatus according to claim 5, wherein one of said sequence building circuits further includes a logic gate interchange circuit inserted between the outputs of said two demultiplexer paths and serving to interchange said outputs or not under the control of the circuit for detecting and handling alarms.

8. Apparatus for implementing a remote signalling method for a digital transmission link which carries digital data, said method comprising the steps of forming a remote signalling message of two non-consecutive sequences, the first sequence being a prefix sequence and the second sequence being a suffix sequence, said sequences being separated by a variable time interval whose length encodes remote signalling data, each of said prefix and suffix sequences being themselves subdivided into two portions each of which is obtained by repeating a binary pattern which is the complement of the binary pattern repeated in the other portion, with the transition between the two portions of a prefix sequence marking the beginning of said time interval encoding remote signalling data, and with the transition between the two portions of a suffix sequence marking the end of said time interval, and transmitting said remote signalling message at the same bit rate as the digital data stream conveyed by said link by momentarily substituting said remote signalling message for the data being carried by said link, said digital link including at least one equipment having a circuit for exploiting signalling and a circuit for recovering the bit rate of the digital data carried on said link, said apparatus comprising at least one message receiver circuit placed in said equipment, said message receiver circuit comprising:

a first circuit for recognizing a non-complemented portion of a sequence and for detecting non-complemented portion patterns, connected to receive the digital data stream and the recovered bit rate thereof, said first circuit having a first output for delivering a signal (Y) representative of a non-complemented sequence portion being recognized and having a second output for delivering a signal ($Y_0$) representative of a pattern being identified from a non-complemented sequence portion;

a second circuit for recognizing a complemented portion of a sequence and for detecting complemented portion patterns, connected to receive the digital data stream and the recovered bit rate thereof, said second circuit having a first output for delivering a signal (X) representative of a complemented sequence portion being recognized and having a second output for delivering a signal ($x_0$) representative of a pattern being identified from a complemented sequence portion;

a third circuit for detecting transitions in sequences comprising a complemented portion followed by a non-complemented portion, said third circuit having two inputs connected to respective ones of the outputs from said first circuit, and one input connected to the first output from said second circuit, and having an output on which it delivers a transition detection signal ($Y_1$);

a fourth circuit for detecting transitions in sequences comprising a non-complemented portion followed by a complemented portion, said fourth circuit having two inputs connected to respective ones of the outputs from said second circuit, and one input connected to the first output from said first circuit, and having an output on which it delivers a transition detection signal ($x_1$);

a fifth circuit for discriminating between transitions in prefix sequences and in suffix sequences, said fifth circuit having two inputs connected to respective outputs from the third and fourth circuits, and delivering an output signal T in the form of a square wave pulse delimited by said transitions;

a sixth circuit for identifying the order of the portions in prefix and suffix sequences, said sixth circuit being connected to the outputs from said third and fourth circuits and from said fifth circuit, and having two outputs, a first output relating to prefix sequences and a second output relating to suffix sequences, said outputs receiving a logic signal representative of the order in which the complemented and non-complemented portions of a given sequence are detected;

a timing circuit connected to the output from said fifth circuit and serving to measure the duration of the output square wave signal therefrom; and a sampling memory which receives the output signals from said timing circuit and from said sixth circuit, and to which data is written after the end of each square wave signal T generated by said fifth circuit.

* * * * *